April 29, 1941. N. F. ADAMSON ET AL 2,240,279
CLUTCH
Original Filed May 10, 1939 2 Sheets-Sheet 1

Inventors:
Nicholas F. Adamson and
Kay L. Bastrup
by Davis, Lindsey, Smith & Shonts
Attys.

Patented Apr. 29, 1941

2,240,279

UNITED STATES PATENT OFFICE 2,240,279

CLUTCH

Nicholas F. Adamson and Kay L. Bastrup, Racine, Wis., assignors to Twin Disc Clutch Company, Racine, Wis., a corporation of Wisconsin Original application May 10, 1939, Serial No. 272,768. Divided and this application May 1, 1940, Serial No. 332,769

6 Claims. (Cl. 192—68)

Our invention relates to clutches and more particularly to that type in which engagement is effected by a mechanical actuation of the component elements in contrast to spring loading.

The principal object of our invention is to provide a clutch of the character indicated in which the adjusting mechanism takes the form of a ring that is threaded on the pressure plate.

This application is a division of our copending application for Clutch, Serial No. 272,768, filed May 10, 1939 and issued as Patent No. 2,229,910 on Jan. 28, 1941.

This and further objects of our invention will be set forth in the following specification, reference being had to the accompanying drawings, and the novel means by which said objects are effectuated will be definitely pointed out in the claims.

Figure 1:
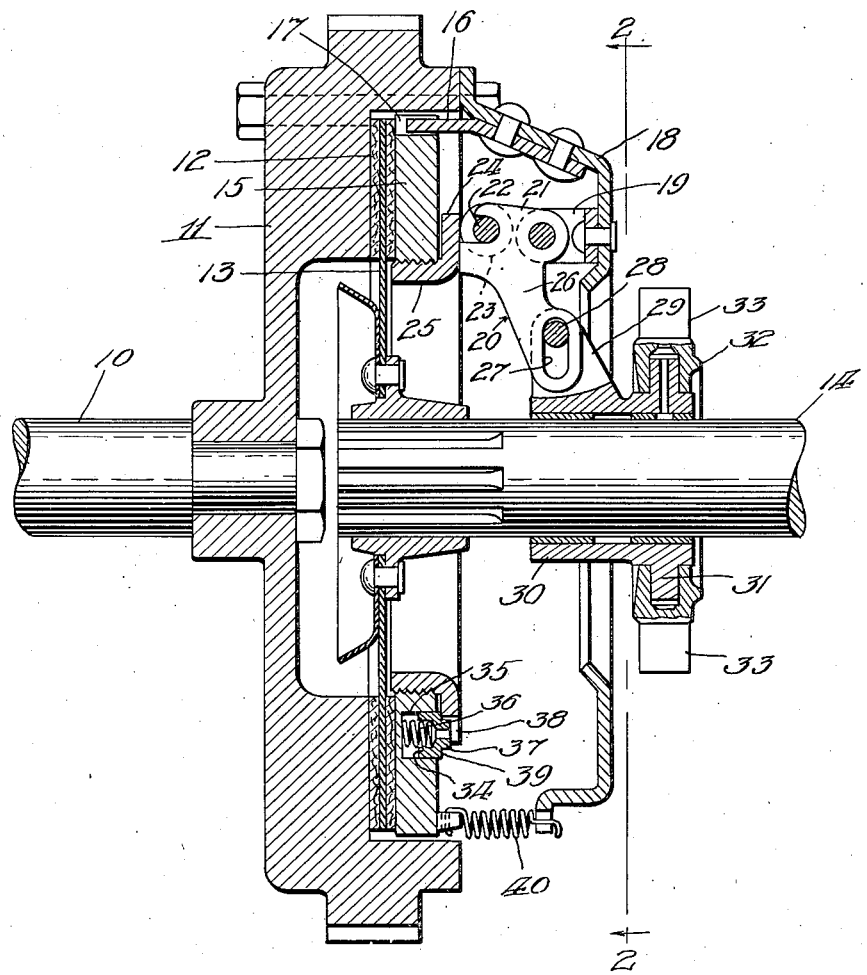
Figure 1 is a sectional elevation of the clutch in an engaged position.

Referring to Fig. 1, the numeral 10 designates a driving shaft having mounted thereon a flywheel 11 which is counterbored to provide an operating face 12. The flywheel functions as the member of the clutch that is held against axial movement and the face 12 engages an annulus of friction material secured to the adjacent side of a driven plate 13 that is slidably connected to a driven shaft 14 so that the plate 13 rotates therewith, but is capable of axial movement relative thereto. It will be understood that the terms "driving" and "driven", as applied to the shafts 10 and 14, respectively, are merely illustrative, since the direction of drive may be reversed without affecting the clutch construction hereafter described.

The friction annulus on the opposite side of the plate 13 is engaged by the adjacent side of a pressure plate 15 which is drivably connected to the flywheel by means of a plurality of circumferentially spaced tongues 16, one end of each tongue being received within a slot 17 cut inward from the periphery of the plate 15 and the opposite end being secured to a cover plate that is fixed on the flywheel and slightly offset therefrom to provide a housing for the operating mechanism.

Figure 2:
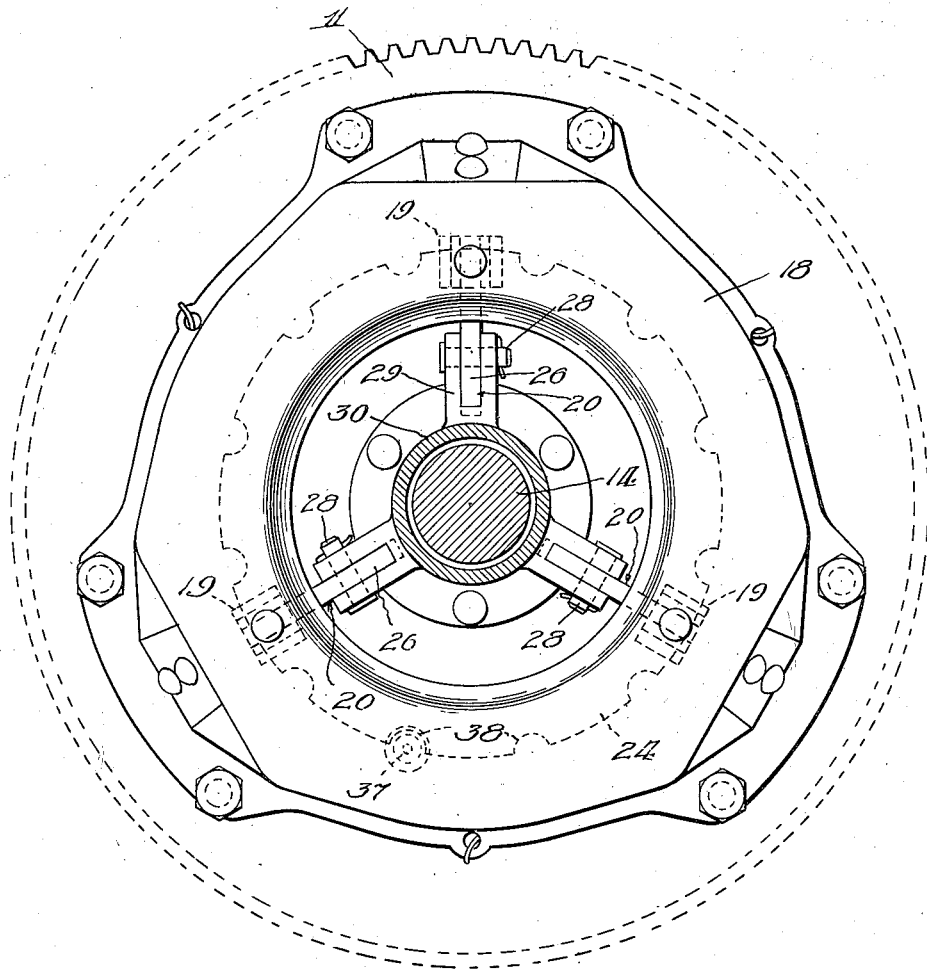
Fig. 2 is a section along the line 4—4 in Fig. 1 showing an end or axial view of the clutch.

This mechanism may take the form of a number of lever devices which may be equispaced around the clutch and three such devices are illustrated in Fig. 2, all being identical. A U-shaped bracket 19 is secured directly to the cover plate 18 and pivotally mounted between the limbs of this bracket is a lever 20 having an arm 21 which extends toward the pressure plate 15. The free end of the arm 21 is bifurcated to receive the reduced central portion 22 of a dual roller 23 which rides along and abuts an annular flange 24 formed on an adjusting ring 25 that is threaded internally of the pressure plate 15.

The other lever arm 26 extends inward toward the driven shaft 14 and it includes an elongated slot 27 within which operates a pin 28 that is mounted on an arm 29. This arm forms part of an actuating sleeve 30 that is slidable along the shaft 14 and which incorporates an annular flange 31 embraced by an operating collar 32 having a pair of trunnions 33 for engagement by the usual shifting fork (not shown).

The ring 25 provides a medium for adjusting the clutch as the facings on the plate 13 wear and as required by the fact that the levers 20 are characterized by a constant throw. The adjusted position of the ring 25 is maintained by a plunger 34 that is slidably mounted in a pocket 35 provided in the pressure plate 15. The plunger is hollow and is normally urged to the right, as viewed in Fig. 1, by a helical spring 36, one end of which abuts against the base of the pocket and the other against the plunger. The latter is provided with a reduced head 37 which is received within any one of a plurality of equally spaced, arcuate notches 38 provided in the periphery of the adjusting ring flange 24. A shoulder 39 is formed on the plunger 34 and normally contacts the inner surface of the flange 24 to limit outward movement of the plunger under the influence of the spring 36. A plurality of release springs 40 connect the pressure and cover plates 15 and 18, respectively, and these springs are under constant tension when the clutch is engaged so that, when the levers 20 are moved to a released position, the springs 40 assist in retracting the plate 15 and maintain contact of the latter plate and the rollers 23.

In Fig. 1, the clutch is shown in an engaged position and, in order to release the clutch, it is merely necessary to move the actuating sleeve 30 toward the right, as viewed in Fig. 1, whereupon the levers 20 will be rocked in a counterclockwise direction and permit the springs 40 to retract the pressure plate 15 to a released position. When the clutch is engaged, the levers 20 are moved in a clockwise direction by shifting the sleeve toward the left and the ensuing axial movement of the pressure plate 15 to clamping position is effected by pressure of the rollers 23 against the flange 24, the levers fulcruming on the bracket 19.

As the clutch facings wear, adjustment of the clutch is easily effected by depressing the plunger 34 sufficiently to free the adjusting ring 25 for rotation, whereupon this ring can be retracted toward the right, as viewed in Fig. 1, a distance sufficient to maintain the desired contact with the roller 23. This adjustment does not require any special tool.

Our improved clutch construction may be easily mounted upon a flywheel, or other rotary part, with the major portion of its operating mechanism substantially housed within the cover plate 18 so that it is characterized by a high safety factor.

We claim:

1. The combination of a rotary member having a cover plate, an annular pressure plate having a bore coaxial with the member drivably connected to the cover plate and axially shiftable to grip a driven plate against the member, an adjusting ring threaded within the bore and having an abutment flange disposed adjacent a side surface of the pressure plate, a lever pivoted on the cover plate and having an arm for engaging the flange, and means for rocking the lever on the cover plate as a fulcrum to cause the arm to move the pressure plate to engaging position.

2. The combination of a rotary member having a cover plate, a pressure plate mounted for rotation with the member and cover plate and axially shiftable to grip a driven plate against the member, an adjusting ring threaded internally of the pressure plate and having an abutment flange disposed adjacent a side surface of the pressure plate, a locking plunger carried by the pressure plate and selectively engageable with any one of a series of notches in the flange to maintain the adjusted position of the adjusting ring, a lever pivoted on the cover plate and having an arm for engaging the flange, and means for rocking the lever on the cover plate as a fulcrum to cause the arm to move the pressure plate to engaging position.

3. In a clutch, the combination of a pair of clutch devices, an annular pressure plate having a bore coaxial with the clutch connected to one of the devices and shiftable to drivably connect both devices, an adjusting ring threaded within the bore and having an abutment flange disposed adjacent a side of the plate, and a lever carried by one of the devices and having a portion engageable with the flange to move the plate to driving position.

4. In clutch construction, the combination of an annular pressure plate having a bore coaxial with the clutch adapted to clamp clutch members in driving engagement, an adjusting ring threaded within the bore and having an abutment flange disposed adjacent a side of the plate, and a lever held against all movements other than a pivoting movement and having a portion engageable with the flange to move the plate to driving position.

5. In clutch construction, the combination of an annular pressure plate having a bore coaxial with the clutch adapted to clamp clutch members in driving engagement, and an adjusting ring threaded within the bore and having an abutment flange lying adjacent one side of the plate, the flange being adapted for contact by the actuating mechanism of the clutch to shift the plate to working position.

6. In clutch construction, the combination of an annular pressure plate having a bore coaxial with the clutch adapted to clamp clutch members in driving engagement, an adjusting ring threaded within the bore and having an abutment flange lying adjacent one side of the plate, the flange being adapted for contact by the actuating mechanism of the clutch to shift the plate to working position, and a locking plunger carried by the pressure plate and selectively engageable with any one of a series of notches in the flange to maintain the adjusted position of the adjusting ring.

NICHOLAS F. ADAMSON.
KAY L. BASTRUP.